United States Patent [19]

Inoue et al.

[11] Patent Number: 5,384,384
[45] Date of Patent: Jan. 24, 1995

[54] SELF-ADHESIVE SILICONE COMPOSITIONS

[75] Inventors: Yoshifumi Inoue; Masatoshi Arai, both of Annaka, Japan

[73] Assignee: Shin-Etsu Chemical Co., Ltd., Tokyo, Japan

[21] Appl. No.: 85,390

[22] Filed: Jul. 2, 1993

[30] Foreign Application Priority Data

Jul. 3, 1992 [JP] Japan .................. 4-200315

[51] Int. Cl.⁶ ............................. C08G 77/06
[52] U.S. Cl. ........................... 528/24; 528/41; 528/43
[58] Field of Search ................. 528/24, 41, 43

[56] References Cited

U.S. PATENT DOCUMENTS

| | | | |
|---|---|---|---|
| 3,635,887 | 1/1972 | Polmanteer | 528/41 |
| 4,213,914 | 7/1980 | Bargain et al. | 556/419 |
| 4,654,161 | 3/1987 | Kollmeier et al. | 528/41 |
| 5,130,401 | 7/1992 | Arai et al. | 528/41 |
| 5,180,771 | 1/1993 | Arai et al. | 528/18 |
| 5,244,938 | 9/1993 | Arai et al. | 528/41 |

Primary Examiner—Melvyn I. Marquis
Assistant Examiner—Karen A. Dean
Attorney, Agent, or Firm—Millen, White, Zelano & Branigan

[57] ABSTRACT

Self-adhesive silicone compositions having (A) an organopolysiloxane of the following average unit equation (1)

$$(R^1)_z\text{—SiO}_{(4-z)/2} \quad (1)$$

wherein $R^1$ is either a substituted or an unsubstituted monovalent hydrocarbon group and Z is a number in the range from 1.98 to 2.01 having a viscosity at 25° C. of at least 300 cSt, (B) an organic silicon compound which possesses at least one group expressed by the following equation (2) within the molecule:

$$-\overset{R^3}{\underset{R^4}{\text{Si}}}-\text{C(CH}_2)_n-\text{COOR}^2 \quad (2)$$

wherein $R^2$ is a substituted or an unsubstituted monovalent hydrocarbon group, $R^3$ and $R^4$ are either a hydrogen atom, methyl group, or an ethyl group, and n is an integer of 0, 1, or 2, and (C) an organic peroxide. The silicone compositions strongly adhere onto various materials such as metals and plastics without the need of primer treatments.

11 Claims, No Drawings

SELF-ADHESIVE SILICONE COMPOSITIONS

This invention relates to self-adhesive silicone compositions which possess a strong adhesivity towards various types of substrates, such as metals, without the need of primers.

BACKGROUND OF THE INVENTION

In general, silicone rubber compositions possess a mold releasing property. Therefore, when they are utilized to bond metals or to adhere to other substrates such as glass, ceramics, plastics, fibers, and rubbers under ordinary vulcanization conditions, it is first necessary to treat such surfaces with a primer. However, the additional treatment step by a primer makes the forming process more complicated. In addition, the primers normally utilized are organic solvent solutions. Such solutions necessitate a facility for the exhaust of organic solvent vapors generated from the forming processes. Further, they can also cause health hazard problems from the absorption of organic solvent gas by operators through breathing and skin contact which may induce internal diseases. Further, some forming conditions, such as in the injection forming process where a strong shear force is applied, also have problems of primer layer effluence and peeling. As a result, the demand is high for self-adhesive silicone rubber compositions which do not require a primer treatment.

Conventionally, self-adhesive silicone rubber compositions have been known to comprise the following chemicals as a component to provide adhesivity: peroxy silanes such as a vinyl tris(t-butyl peroxy) silane, triphenyl (t-butyl peroxy) silane, trimethyl (t-butyl peroxy) silane, and methyl vinyl di(t-butyl peroxy) silane; and silane coupling agents such as a vinyl trimethoxy silane, vinyl triethoxy silane, γglycidoxy propyl trimethoxy silane, and γ-methacryloxy propyl trimethoxy silane.

However, these self-adhesive-type silicone rubber compositions have not possessed a satisfactory level of the self-adhesivity. Therefore, the purpose of this invention is to provide self-adhesive silicon compositions which possess a strong adhesivity towards various types of substrates without using special types of primers.

SUMMARY OF THE INVENTION

The invention is directed to self-adhesive silicone compositions which comprise:
(A) an organopolysiloxane expressed by the following average unit equation (1):

$$(R^1)_z-SiO_{(4-z)/2} \quad (1)$$

wherein $R^1$ is either a substituted or an unsubstituted monovalent hydrocarbon group and Z is a number in the range from 1.98 to 2.01, and having a viscosity at 25° C. of at least 300 cSt,
(B) an organic silicon compound which possesses at least one group expressed by the following equation (2) within the molecule:

(2)

wherein $R^2$ is a substituted or an unsubstituted monovalent hydrocarbon group, $R^3$ and $R^4$ are either a hydrogen atom, methyl group, or ethyl group, and n is an integer of 0, 1, or 2, and
(C) an organic peroxide.

DESCRIPTION OF THE INVENTION

(A) Organopolysiloxane

In the self-adhesive silicone compositions of this invention for component (A), the base polymer is an organopolysiloxane expressed by said average unit equation (1):

$$(R^1)_z-SiO_{(4-z)/2} \quad (1)$$

wherein $R^1$ is either a substituted or an unsubstituted monovalent hydrocarbon group and Z is a number in the range from 1.98 to 2.01. In this unit equation (1), examples of $R^1$ which is a substituted or unsubstituted hydrocarbon group, are: alkyl groups of, for example, 1 to 8 carbon atoms, such as a methyl group, ethyl group, propyl group, and butyl group; alkenyl groups of, for example, 2 to 8 carbon atoms, such as a vinyl group and an allyl group; aryl groups of, for example, 6 to 8 carbon atoms, particularly carbocyclic aryl groups, such as a phenyl group and a tolyl group; cycloalkyl groups of, for example, 4 to 8 carbon atoms, such as a cyclohexyl group; and these groups in which a part, or all, of the hydrogen atoms are independently substituted by halogen atoms, such as a fluorine atom, chlorine atom and bromine atom, and/or a cyano group. Examples of such substituted $R^1$ groups are a chloromethyl group, a trifluoropropyl group, and a cyanomethyl group. The particularly suitable groups for $R^1$ in this invention are a methyl group, ethyl group, phenyl group, γ-trifluoropropyl group, cyanoethyl group, vinyl group, and an allyl group.

Further, at least 50 mol % of the $R^1$ group within this organopolysiloxane molecule is preferably a methyl group, more preferably the methyl group is to be at least 80 mol %. Less than 50 mol % of the methyl group containment per total $R^1$ may lead to compounds with different characteristics from the original methyl polysiloxane or make the raw material cost higher, resulting in the disadvantageous production cost.

In addition, the Z value is in the range of 1.98 to 2.01 in this average unit equation (1), which indicates that this organopolysiloxane is practically linear. Further, the viscosity of the organopolysiloxane at 25° C. must be at least 300 cSt, preferably $1 \times 10^4$–$1 \times 10^8$ cSt. A viscosity of less than 300 cSt will lead to insufficient mechanical strength in practical applications. The organopolysiloxane component (A) can be prepared by the known method of ring-opening polymerization of a cyclic polysiloxane, a compound well-known as an oligomer, in the presence of acid or base catalysts.

(B) Organic silicon compound

The organic silicon compound, component (B), provides the composition its adhesivity. The organic silicon compound possesses at least one group expressed by the general formula (2) within the molecule. In this general formula (2), $R^2$ is an unsubstituted or a substituted monovalent hydrocarbon group. Examples of such $R^2$ groups are: alkyl groups having, for example, 1 to 10 carbon atoms, particularly 1 to 8 carbon atoms, such as a methyl group, ethyl group, propyl group, and a butyl group; alkenyl groups of, for example, 2 to 10 carbon atoms, particularly 2 to 8 carbon atoms; cycloalkyl groups of, for example, 4 to 10 carbon atoms, particularly 4 to 8 carbon atoms; and aryl groups of, for example, 6 to 10 carbon atoms, particularly 6 to 8 carbon atoms, and particularly carbocyclic aryl groups, such as phenyl groups. The hydrogen atoms in these groups may be substituted with halogen atoms and/or a methyl group. Further, $R^3$ and $R^4$ are independently either a hydrogen atom, a methyl group, or an ethyl group. In addition, n is a number 0, 1, or 2. The group expressed by the general formula (2) contributes the effective increase in the adhesivity. Such a group may be directly bonded to a silicon atom in the organic silicon compound or indirectly bonded to a silicon atom through other groups such as, for example, alkylene groups, such as, for example, —CH$_2$— or —CH(CH$_3$)—. In general, direct bonding to a silicon atom is preferred.

Examples of compounds useful as component (B) in the claimed invention are those of the following formulae (3):

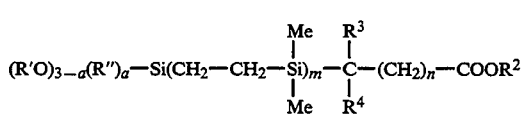 (3a)

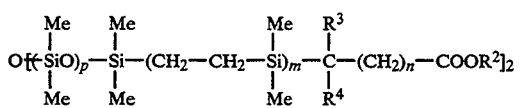 (3b)

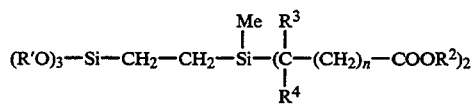 (3c)

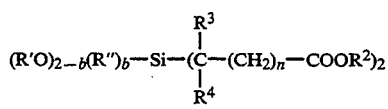 (3d)

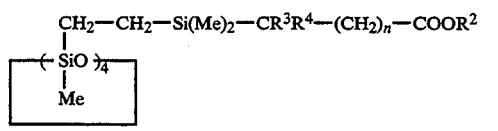 (3e)

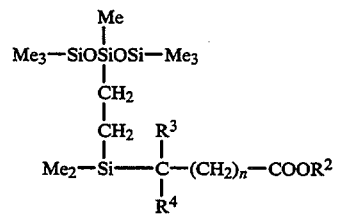 (3f)

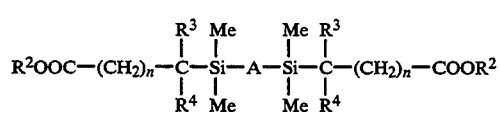 (3g)

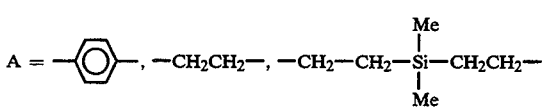

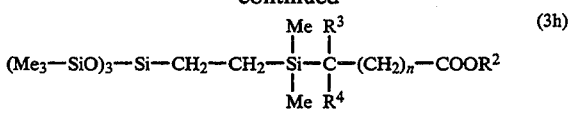 (3h)

where $R^2$, $R^3$, $R^4$ and n have their previous meanings, $R'=C_1-C_8$ alkyl, $R''=C_1-C_8$ alkyl or phenyl, a=0–3, b=0–2, m=0 or 1 and p=0–20.

Specific examples of the organic silicon compound as the component (B) are as follows:

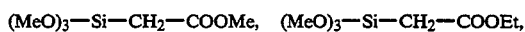

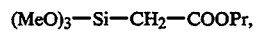

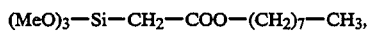

(MeO)$_3$—Si—CH$_2$—COO—(CH$_2$)$_7$—CH$_3$,

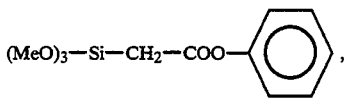

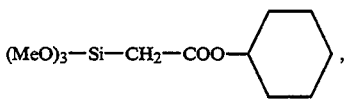

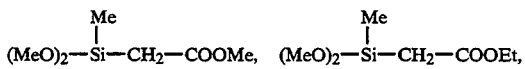

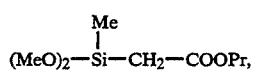

(MeO)$_2$—Si—CH$_2$—COO—C$_8$H$_{17}$,

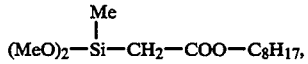

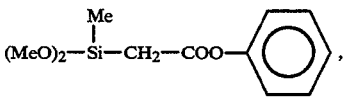

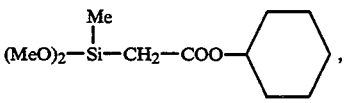

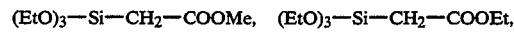

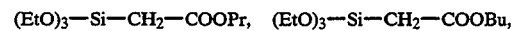

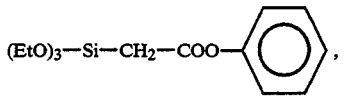

(MeO)$_3$—Si—CH$_2$—COO—(CH$_2$)$_7$CH$_3$,

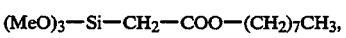

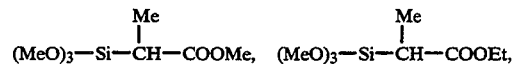

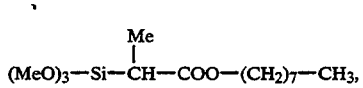

(MeO)₃—Si—CH(Me)—COO—C₆H₅, (MeO)₂—Si(Me)—CH(Me)—COOMe,  (MeO)₂—Si(Me)—CH(Me)—COOEt, (MeO)₂—Si(Me)—CH(Me)—COOPr,  (MeO)₂—Si(Me)—CH(Me)—COOBu, (MeO)₂—Si(Me)—CH(Me)—COO—C₈H₁₇, (MeO)₂—Si(Me)—CH(Me)—COO—C₆H₅, (MeO)₂—Si(C₆H₅)—CH(Me)—COOMe,  (MeO)₂—Si(C₆H₅)—CH(Me)—COOEt, (MeO)₂—Si(Et)—CH(Me)—COOMe,  (EtO)₃—Si—CH(Me)—COOMe, (EtO)₃—Si—CH(Me)—COOEt,  (EtO)₃—Si—CH(Me)—COOPr, (EtO)₃—Si—CH(Me)—COOBu,  (EtO)₃—Si—CH(Me)—COO—C₈H₁₇, (EtO)₃—Si—CH(Me)—COO—C₆H₅, (EtO)₂—Si(Me)—CH(Me)—COOMe,  (EtO)₂—Si(Me)—CH(Me)—COOEt, (EtO)₂—Si(Me)—CH(Me)—COOPr,  (EtO)₂—Si(C₆H₅)—CH(Me)—COOMe, (EtO)₂—Si(Et)—CH(Me)—COOEt,  (MeO)₃—Si—CH(Et)—COOMe, (MeO)₃—Si—CH(Et)—COOEt,  (MeO)₂—Si(Me)—CH(Et)—COOMe, (BuO)₃—Si—CH₂—COOMe,  (BuO)₃—Si—CH(Me)—COOEt, (C₈H₁₇O)₃—Si—CH₂—COOMe,  (C₈H₁₇O)₃—Si—CH(Me)—COOEt, (MeO)₃—Si—CH₂—CH₂—COOMe,

-continued (MeO)₃—Si—CH₂—CH₂—COOEt, (MeO)₃—Si—CH(Me)—CH₂—COOMe, (MeO)₃—Si—CH(Me)—CH₂—COOEt, (MeO)₃—Si—CH₂—CH₂—CH₂—COOMe, (MeO)₃—Si—CH₂—CH₂—CH₂—COOEt, (EtO)₃—Si—CH₂—CH₂—CH₂—COOMe, (EtO)₃—Si—CH₂—CH₂—CH₂—COOEt, Me₃—Si—CH₂—COOMe,  Me₃—Si—CH₂—COOEt, Me₃—Si—CH₂—COO—(CH₂)₂—CH₃, Me₃—Si—CH₂—COO—(CH₂)₃—CH₃, Me₃—Si—CH₂—COO—(CH₂)₇—CH₃, Me₃—Si—CH₂—COO—C₆H₅,  Et₃—Si—CH₂—COOEt, Et—Si(Me)(Me)—CH₂—COOEt,  Et₂—Si(Me)—CH₂—COOMe,

[CH₃(CH₂)₂]₃Si—CH₂—COOEt,

[CH₃(CH₂)₂]₃Si—CH₂—COOMe,

[CH₃(CH₂)₂]₃Si—CH₂—COO—(CH₂)₃—CH₃,

[CH₃(CH₂)₂]₃Si—CH₂—COO—(CH₂)₇—CH₃,

CH₃—(CH₂)₅—Si(Me)(Me)—CH₂—COOMe,

CH₃—(CH₂)₅—Si(Me)(Me)—CH₂—COOEt,

CH₃—(CH₂)₅—Si(Me)(Me)—CH₂—COO—(CH₂)₃—CH₃,

CH₃—(CH₂)₅—Si(Me)(Me)—CH₂—COO—(CH₂)₅—CH₃,

CH₃—(CH₂)₇—Si(Me)(Me)—CH₂—COOEt,

CH₃—(CH₂)₇—Si(Me)(Me)—CH₂—COOMe,

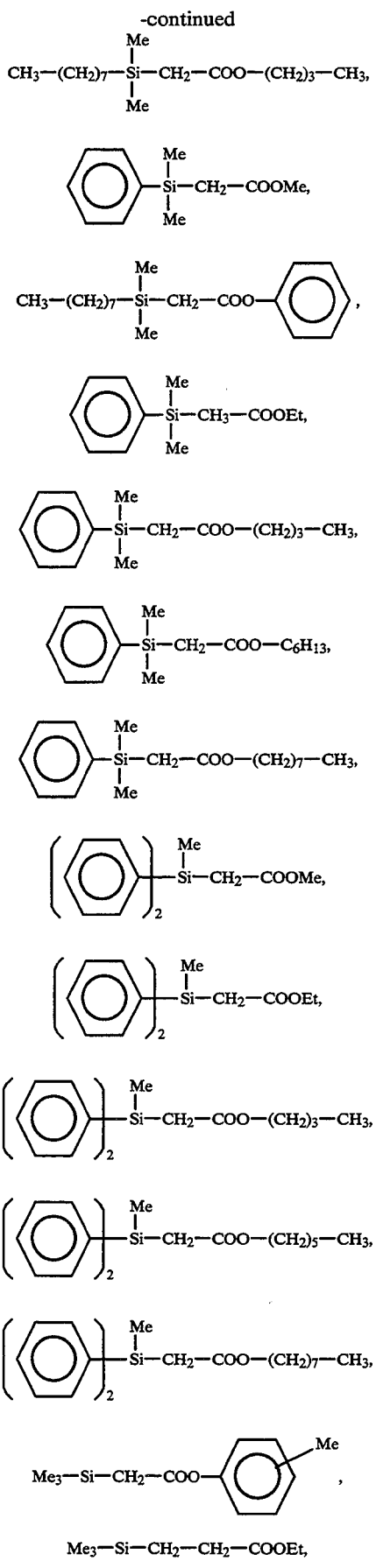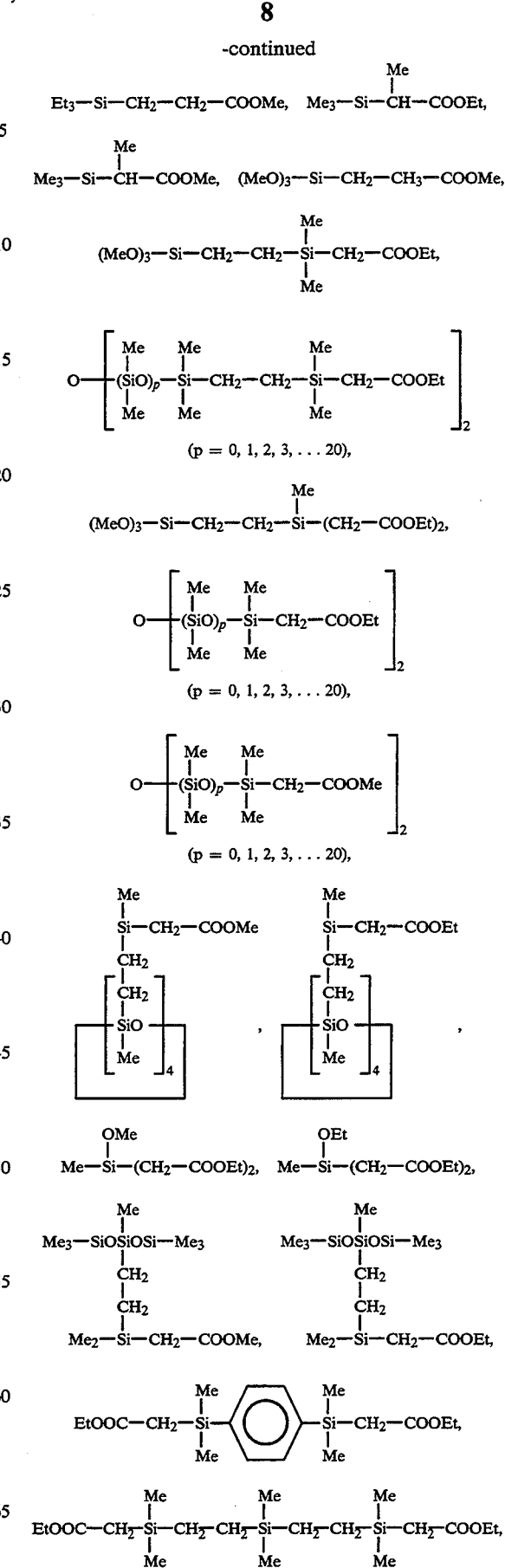

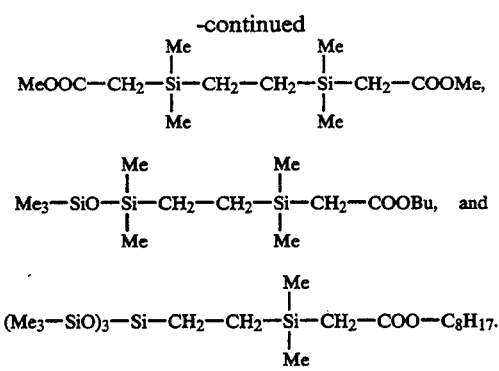

This (B) component is preferably utilized in amounts of 0.01 to 30 weight parts, more preferably in the range from 0.1 to 10 weight parts, against 100 weight parts of the said (A) component of organopolysiloxane. Less than 0.01 weight part will not provide sufficient adhesivity, while 30 weight parts of more is economically disadvantageous.

(C) Organic peroxide

The (C) component, organic peroxide, functions as a cross-linking agent. Examples are: benzoyl peroxide, 2,2',4 4'-tetrachlorobenzoyl peroxide, di-t-butyl peroxide, dicumyl peroxide, t-butyl perbenzoate, t-butyl peracetate, 2,5-dimethyl-2,5-di-t-butyl peroxy hexane, and t-butyl peroxy myristyl carbonate. This (C) component is utilized in amounts of 0.01 to 10 weight parts, more preferably 0.3 to 10 weight parts, against 100 weight parts of the said (A) component. When less than 0.01 weight part is employed, insufficient vulcanization will take place. On the other hand, employment of more than 10 weight parts will diminish the physical properties of the obtain cured products, such as tensile strength, elongation property, and heat resistance.

Other Additives

The compositions of this invention may comprise various particulate or fibrous fillers as necessary in order to increase the viscosity prior to curing, to improve workability and physical properties such as hardness, tensile strength and elongation properties of cured products, and to intensify the adhesivity. Examples of such fillers are: fumed silica, precipitated silica, quartz powder, diatomaceous earth, hollow glass balls, iron oxide, zinc oxide, titanium dioxide, magnesium oxide, talc, aluminum silicate, alumina, calcium carbonate, carbon black, asbestos, glass fibers, carbon fibers, polyester fibers, polytetrafluoroethylene powder, and polyvinyl chloride powder. These fillers may be added in amounts such that the self-adhesivity of the compositions is not deteriorated.

Further, the conventionally known refining agents may also be mixed in the compositions. Examples are various types of silane coupling agents such as a γ-glycidoxy propyl trimethoxy silane, γ-mercaptopropyl trimethoxy silane, γ-aminopropyl trimethoxy silane, vinyl trialkoxy silane, metallic salts of organic carboxylic acid, titanic acid esters, chloroplatinic acids, heat resistance agents, noninflammable agents, organic solvents, and dispersing agents.

Self-adhesive silicone compositions

The self-adhesive silicone compositions of this invention can be obtained by mixing the appropriate amounts of the said components. These compositions easily form the cured products in the form of a rubber, resin or gel, depending on the ratio of each component. For example, after placing the compositions of this invention on the solid surfaces of a metal, plastic, rubber or glass, they are heated to the temperature level of at least the decomposition temperature of the component (C), the organic peroxide (about 100° to 500° C.). Then the compositions form cross-linkings and become a silicone rubber, silicone resin, or silicone gel as desired. At the same time, they adhere onto the solid surface uniformly and strongly.

The conventional adhesion methods with primer treatments and with the conventional self-adhesive rubber compositions required at least 150° C. of vulcanization temperature in order to achieve a good adhesivity. Therefore, these methods had a limitation towards the use of plastics as an adhered body. However, the compositions of this invention enable the vulcanization at uncharacteristically low temperatures of 110° to 130° C. and thus they can be used with plastics as an adhered body.

The materials which can be adhered by the compositions of this invention are, for example: metals such as iron, aluminum, stainless steel, nickel, copper and chromium; plastics such as epoxy resins, acrylic resins, polyethylene phthalate resins, unsaturated polyester resins, polyamide resins, and polystyrene terephthalate resins; various types of synthetic fibers, natural fibers, inorganic fibers such as glass fibers, natural rubber, synthetic rubber, glass, quartz, and ceramics. The compositions of this invention are useful as adhesives with strength and durability, sealing agents, coating agents, packing agents, infusion agents, and impregnation agents.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Japanese 4-200,315, filed Jul. 3, 1992, are hereby incorporated by reference.

EXAMPLES

Below this invention is explained in detail using examples. In the following section, all the parts indicate parts by weight and the viscosity values were obtained at 25° C.

Example 1

A mixture (a) was prepared by mixing 100 parts of methyl vinyl polysiloxane which comprises 99.8 mol % of dimethyl siloxane units and 0.2 mol % of vinyl methyl siloxane units (viscosity: 5,000,000 cSt), and 40 parts of hydrophobic fumed silica with a specific surface area of 200 m²/g. The mixture was made uniform with a kneader mixer. Then a curable composition was prepared by adding 2.0 parts of a silane compound expressed by the equation below:

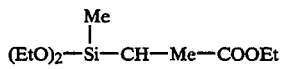

and 1.5 parts of a silicone oil paste which comprises 50% of benzoyl peroxide into the 100 parts of the mixture (A). The obtained mixture was placed onto various materials which were to be adhered, pinched by a mold, and adhered under the pressure of 20 kgf/cm² at 165° for 10 minutes. As a result, the adhered samples with a sufficient vulcanization were obtained. After cooling these adhered samples to room temperature, the adhesion strength was measured following the method specified in the JIS K 6301, wherein the adhered rubber is peeled off at a 90° direction. The results are shown in Table 1. Further, the vulcanized products were tested for their hardness, tensile strength, and elongation by following the "physical Property Test Methods for Vulcanized Rubber" in the JIS K 6301. The results are shown in Table 2.

TABLE 1

| Materials adhered | Adhesion strength (kfg/cm²) |
|---|---|
| Stainless steel | 8.3 |
| Iron | 8.5 |
| Polyester resin | 10.5 |
| Glass fiber reinforced epoxy resin | 8.6 |

Example 2

A curable composition was prepared by adding 2.5 parts of a silane compound expressed by the following equation:

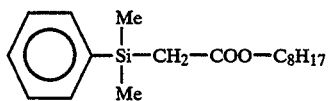

and 1.5 parts of a silicone oil paste which comprises 50% of 2,2',4,4'-tetrachlorobenzoyl peroxide into the 100 parts of the mixture (a) obtained in Example 1. The obtained composition was placed onto stainless steel, pinched by a mold, and adhered under the pressure of 20 kgf/cm² at 165° C. for 10 minutes. Using this adhered sample, similar tests to those in Example 1 were carried out. The results are shown in Table 2.

TABLE 2

|  | Example 1 | Example 2 |
|---|---|---|
| Adhesion Strength | 8.3 | 8.7 |
| Hardness | 49 | 53 |
| Tensile strength (kgf/cm²) | 101 | 99 |
| Elongation (%) | 460 | 350 |

Example 3

100 parts of dimethyl polysiloxane having its molecular ends blocked with trimethyl silyl groups (viscosity: 1,000,000 cSt), 40 parts of precipitated silica with a specific surface area of 300 m²/g, and 3 parts of dimethyl dimethoxy silane (a dispersion agent) were mixed with a kneader and heat treated at 160° C. for two hours. A curable composition was prepared by adding 2.1 parts of the silane compound expressed by the following equation:

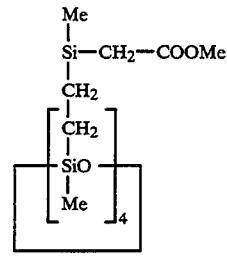

and two parts of a silicone oil paste which comprises 50% of t-butyl perbenzoate into the 100 parts of the mixture obtained above. The obtained composition was placed onto stainless steel, and the adhered sample was prepared by the similar method in Example 1. The measured adhesion strength was 9.7 kgf/cm², which is a satisfactory value.

Example 4, 5 and 6

100 parts of the same methyl vinyl polysiloxane utilized in Example 1 and the 40 parts of hydrophobic fumed silica with a specific surface area of 100 m²/g were mixed in a kneader mixer until uniform. Vulcanization agents were added to the 100 parts of the obtained mixture at the ratio listed in Table 3 in order to prepare the curable compositions. For example, an adhesion sample was prepared by the similar method in Example 1 using stainless steel. The similar measurements as in Example 1 were also carried out. The results are shown in Table 3.

TABLE 3

|  | Example 4 | Example 5 | Example 6 |
|---|---|---|---|
| Mixture | 100 | 100 | 100 |
| (MeO)₃-Si-CH-Me-COOEt | 0.02 | 3 | 8 |
| 2,2',4,4'-tetra-chlorobenzoyl peroxide (50% silicone oil paste) | 1.2 | — | — |
| Adhesion strength (kgf/cm²) (Stainless steel) | 7.8 | 8.2 | 8.9 |
| Hardness | 4.9 | 48 | 52 |
| Tensile strength (kgf/cm²) | 110 | 104 | 93 |
| Elongation (%) | 430 | 420 | 370 |

Example 7 and comparison Example 1

A curable composition was prepared by mixing 0.5 parts of a silane compound expressed by the following equation:

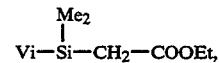

(where Vi is vinyl) and 2 parts of the silicone oil paste used in Example 2 into the 100 parts of the mixture (a) obtained in Example 1 (Example 7). Further, another curable composition was prepared for comparison, by the same method except that the above silane compound was not used (Comparison Example 1). For these compositions, the adhesion samples were prepared similarly as in Example 1 using stainless steel and the similar measurements were also carried out. The results are shown in Table 4.

TABLE 4

|  | Example 7 | Comparison Example 1 |
|---|---|---|
| Mixture (a) | 100 | 100 |

TABLE 4-continued

|  | Example 7 | Comparison Example 1 |
| --- | --- | --- |
| Me$_2$<br>  \|<br>Vi—Si—CH$_2$—COOEt | 0.5 | 0 |
| 2,2',4,4'-tetra-chlorobenzoyl peroxide (50% silicone oil paste) | 2 | 2 |
| Adhesion strength (kgf/cm$^2$) (Stainless Steel) | 8.7 | 0.7 |
| Hardness | 50 | 52 |
| Tensile strength (kgf/cm$_2$) | 100 | 95 |
| Elongation (%) | 520 | 500 |

The silicone compositions of this invention strongly adhere onto various materials such as metals and plastics without the need of primer treatments.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A self-adhesive silicone composition which comprises:

(A) an organopolysiloxane expressed by the following average unit equation (1):

$$(R^1)_z\text{—SiO}_{(4-z)/2} \quad (1)$$

wherein $R^1$ is either a substituted or an unsubstituted monovalent hydrocarbon group and Z is a number in the range from 1.98 to 2.01, and having a viscosity at 25° C. of at least 300 cSt, (B) an organic silicon compound which possesses at least one group expressed by the following equation (2) within the molecule:

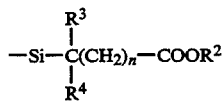

(2)

wherein $R^2$ is a substituted or an unsubstituted monovalent hydrocarbon group, $R^3$ and $R^4$ are independently either a hydrogen atom, methyl group, or ethyl group, and n is an integer 0, 1, or 2, and (C) an organic peroxide.

2. The composition of claim 1, wherein in the organosiloxane (A), $R^1$ is alkyl of 1 to 8 carbon atoms, alkenyl of 2 to 8 carbon atoms, carbocyclic aryl of 6 to 8 carbon atoms or cycloalkyl of 4 to 8 carbon atoms, wherein the hydrogen atoms on the groups for $R^1$ are optionally substituted with halogen atoms and/or a cyano group.

3. The composition of claim 1, wherein, in the organosiloxane (A), at least 50% of the $R^1$ groups are methyl.

4. The composition of claim 1, wherein, in the organosiloxane (A), at least 80% of the $R^1$ groups are methyl.

5. The composition of claim 1, wherein the organosiloxane (A) has a viscosity of $1 \times 10^4 - 1 \times 10^8$ cSt.

6. The composition of claim 1, wherein, in the organic silicon compound (B), $R^2$ is alkyl of 1 to 10 carbon atoms or phenyl group, wherein the hydrogen atoms on the groups for $R^2$ are optionally substituted with halogen atoms and/or a methyl group.

7. The composition of claim 1, wherein the organic silicon compound (B) is of one of the following formulae:

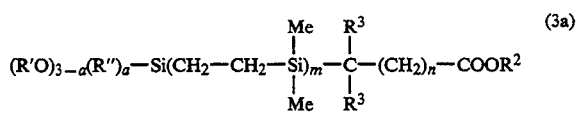

(3a)

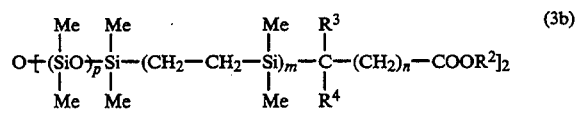

(3b)

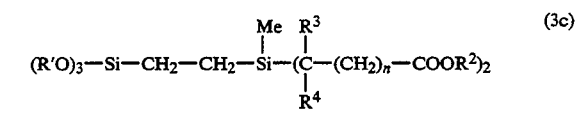

(3c)

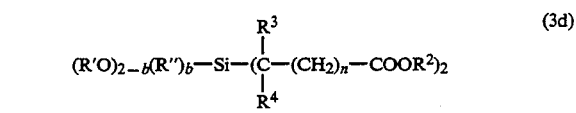

(3d)

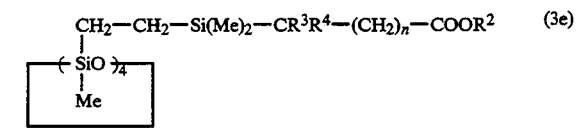

(3e)

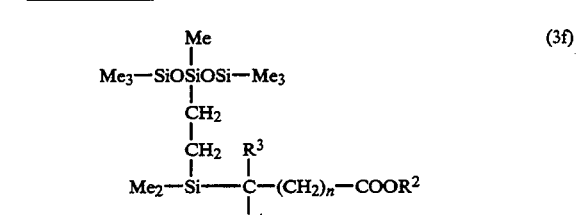

(3f)

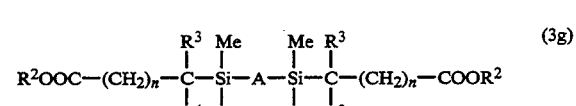

(3g)

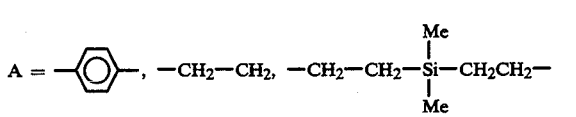

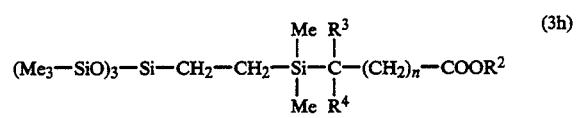

(3h)

where R' is C$_1$-C$_8$ alkyl, R" is C$_1$-C$_8$ alkyl or phenyl, $R^2$ is a substituted or unsubstituted monovalent hydrocarbon group, $R^3$ and $R^4$ are independently a hydrogen atom, methyl or ethyl group, n=0—2, a=0—3, b=0—2, m=0 or 1 and p=0—20.

8. The composition of claim 1, wherein the organic silicon compound (B) is present in an amount of 0.01 to 30 parts by weight based on 100 parts by weight of organopolysiloxane (A).

9. The composition of claim 1, wherein the organic silicon compound (B) is present in an amount of 0.1 to 10 parts by weight based on 100 parts by weight of organopolysiloxane (A).

10. The composition of claim 1, wherein the organic peroxide (C) is present in an amount of 0.001 to 10 parts by weight based on 100 parts by weight of the organopolysiloxane (A).

11. The composition of claim 1 which is vulcanizable at a temperature of 110° to 130° C.

* * * * *